United States Patent [19]

Francis, Jr. et al.

[11] Patent Number: 5,424,893
[45] Date of Patent: Jun. 13, 1995

[54] GAS DISCHARGE DEVICE POWER SUPPLY WITH GROUND FAULT PROTECTION

[76] Inventors: Ralph M. Francis, Jr., 1505 Crabapple Dr., Racine, Wis. 53045; Michael Garjian, 7 Fairfield Ave., Easthampton, Mass. 01027

[21] Appl. No.: 209,814

[22] Filed: Mar. 11, 1994

[51] Int. Cl.6 .............................................. H02H 3/16
[52] U.S. Cl. ........................................ 361/45; 361/46; 361/50
[58] Field of Search ................... 361/45, 49, 46, 50

[56] References Cited

U.S. PATENT DOCUMENTS

| | | |
|---|---|---|
| 3,171,062 | 2/1965 | Rowe, Jr. |
| 3,475,653 | 10/1969 | Odenberg et al. |
| 4,156,884 | 5/1979 | Eckart et al. ............... 361/46 |
| 4,312,022 | 1/1982 | Bailen .......................... 361/46 |
| 4,370,692 | 1/1983 | Wellman, Jr. et al. ..... 361/109 |
| 4,507,698 | 3/1985 | Nilssen ......................... 361/42 |
| 4,598,331 | 7/1986 | Legatti ......................... 361/48 |
| 4,613,934 | 9/1986 | Pacholok ................... 363/131 |
| 4,816,957 | 3/1989 | Irwin ............................. 361/45 |

Primary Examiner—Todd Deboer
Attorney, Agent, or Firm—Quarles & Brady; George E. Haas

[57] ABSTRACT

A gas discharge device, such as a neon tube, is connected to a pair of output terminals of a power supply. The power supply has a transformer with a secondary winding that has first and second sub-windings. Each of the sub-winding is connected to a different output terminal and two conductors connect the first and second sub-windings to earth ground. A current sensor detects whether unequal magnitudes of current flow through in the two conductors. A resonant control circuit applies an excitation current to the primary winding of the transformer unless an imbalance of current flows. Thus excitation of the transformer is terminated when a high voltage ground fault occurs.

13 Claims, 1 Drawing Sheet

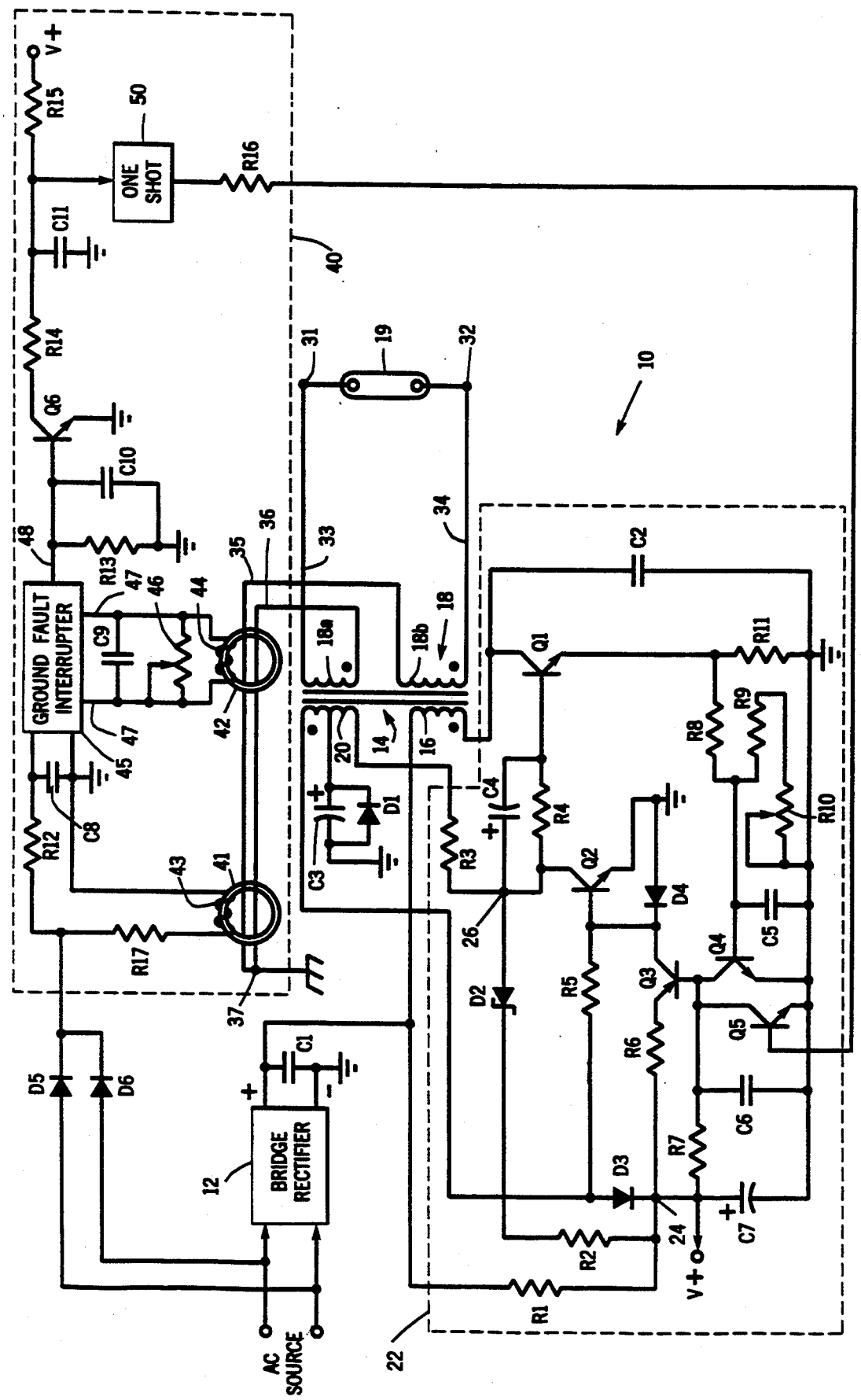

GAS DISCHARGE DEVICE POWER SUPPLY WITH GROUND FAULT PROTECTION

BACKGROUND OF THE INVENTION

The present invention relates to gas discharge devices, such as those used to create luminous displays or signs; and particularly to the power supply for exciting the gas discharge device.

Luminous displays are constructed by infusing a gas, such as neon or argon, into a hermetically sealed transparent structure, such as a tube or a sandwich of plates. When a high alternating excitation voltage directly or indirectly is applied to the gas, the gas ionizes causing it to glow.

The conventional power supply for applying the excitation voltage to the gas discharge device merely comprised a high voltage transformer which stepped the supply line voltage (120 volts at 60 Hertz or 240 volts at 50 Hertz) up to the high excitation voltage. An alternative type of high voltage power supply is commonly referred to as a resonant converter and is described in U.S. Pat. No. 4,613,934. In this device, the primary winding of the transformer was connected to a resonant circuit which applied pulses of the rectified supply line voltage to the primary winding. Because of the resonant nature of the supply circuit, the peak voltage applied to the primary winding was several times the supply line voltage and the frequency of the primary voltage is several hundred times the supply line frequency. This enabled the number of windings of the primary to be reduced, and the transformer core made lighter.

Neither of these previous power supplies offered any protection to the user from electrical shock which occurred when the user came into contact with a high voltage conductor and a grounded component. Ground fault protection has been employed in various types of electrical devices by connecting a ground fault circuit interrupter (GFCI) to the electrical supply lines to the device. However, merely connecting the GFCI to the 120 volt or 250 volt supply line for a neon sign power supply does not offer protection from a shock at the high voltage side of the transformer.

SUMMARY OF THE INVENTION

An object of the present invention is to provide a power supply for a gas discharge device in which the power supply has ground fault protection in the high voltage portion of the power supply. Thus the current flow will be switched off in response to a high voltage ground fault occurring.

A power supply comprises first and second output terminals to which the gas discharge device can be connected. A transformer has a primary winding, and a secondary winding with first and second sub-windings that are inductively coupled to the primary winding. The first sub-winding is connected to earth ground by a first conductor and to the first output terminal. The second sub-winding is connected to earth ground by a second conductor and to the second output terminal.

A sensor detects whether current flowing in the first conductor is unequal in magnitude to current flowing in the second conductor. A controller supplies excitation electricity to the primary winding of the transformer when the sensor does not detect an imbalance in the magnitude of current flowing through said first and second conductors.

Unequal currents flow in the two sub-winding conductors when a ground fault exists in the high voltage circuitry coupled to the transformer secondary winding. That inequality is detected by the sensor and the controller responds by terminating the excitation of the transformer primary winding. Thus the power supply shuts down, thereby preventing shock or damage due to the ground fault.

BRIEF DESCRIPTION OF THE DRAWINGS

The FIGURE is a schematic diagram of a power supply according to the present invention.

DESCRIPTION OF THE PRESENT INVENTION

With initial reference to FIG. 1, a high voltage power supply 10 receives alternating electricity from an AC source that is connected to the input of a full-wave, diode bridge rectifier 12. The rectifier 12 produces a DC output voltage across a filter capacitor C1. The negative terminal of the bridge rectifier 12 is connected to the circuit ground and the positive terminal is connected to one end of a primary winding 16 of output transformer 14. The other end of the primary winding 16 is connected to circuit ground through the collector-emitter conduction path of drive transistor Q1 which is in series with a current sensing resistor R11. When the drive transistor Q1 is turned on, DC current from the rectifier 12 flows through the primary winding 16. A capacitor C2 is connected between the collector of drive transistor Q1 and circuit ground, in parallel with transistor Q1 and resistor R11, to form a resonant circuit with the primary winding 16.

The output transformer 14 has two secondary windings 18 and 20. One secondary winding 18 produces the high output voltage and is coupled by conductors 33 and 34 to output terminals 31 and 32 to which a gas discharge device 19 is connected. Secondary winding 18 is formed by two sub-windings 18a and 18b connected in series by connecting one end of each sub-winding together and to earth ground at connection 37. The gas discharge device 19 is connected by conductors 33 and 34 across the other ends of both sub-windings 18a and 18b. Another secondary winding 20 has an intermediate tap that is connected to circuit ground by capacitor C3. A diode D1 is placed in parallel to capacitor C3 with the anode of the diode being connected to circuit ground. As will be described, this latter secondary winding 20 produces a feedback signal that in part governs the operation of a control circuit 22 which operates drive transistor Q1.

The control circuit 22 has a node 24 that is connected to the positive terminal of the diode bridge rectifier 12 by resistor R1. A relatively large capacitor C7 is connected between node 24 and circuit ground. As will be described, capacitor C7 is charged by voltage pulses appearing at node 24 and in turn supplies bias voltage V+ to the components of the control circuit 22. The series connection of resistor R2 and Zener diode D2 couples node 24 to node 26, which in turn is connected by resistor R3 to one end of secondary winding 20. The other end of this secondary winding 20 is connected by diode D3 to node 24 of the control circuit. Node 26 is coupled to the base of drive transistor Q1 by resistor R4 and capacitor C4, which are connected in parallel.

The node 28 between diode D3 and secondary winding 20 of the output transformer 14 is connected by resistor R5 to the base of transistor Q2 having its collector connected to node 26 and its emitter connected to circuit ground. The base of transistor Q2 also is coupled to circuit ground by normally reversed biased diode D4, which prevents an extremely negative voltage from occurring at the transistor's base during collapse of a magnetic field in the transformer 14. Transistor Q3 has a collector attached to the base of transistor Q2 and an emitter coupled to node 24 by resistor R6. The base of transistor Q3 is connected to node 24 by resistor R7 and to circuit ground by the collector-emitter paths of two transistors Q4 and Q5 connected in parallel.

The base of transistor Q4 is controlled by the magnitude of the current flowing through the primary winding 16 of output transformer 14. This current flow produces a proportional voltage across sensing resistor R11, which voltage also appears across a voltage divider consisting of resistors R8, R9 and R10 connected in series. Resistor R10 is variable providing an adjustable threshold for the primary winding current at which transistor Q4 turns on. Resistor R9 may be a cadmium photo cell which alters the voltage divider with changes in the ambient light in which the gas discharge device is located. The junction between resistors R8 and R9 is connected to the base of transistor Q4 and to circuit ground by a filter capacitor C5. Another capacitor C6 is connected across the emitter and collector of transistor Q4.

When electricity from the AC source is initially applied to the diode bridge rectifier 12, capacitors C1 and C7 begin charging. Capacitor C7 charges at a slower rate determined by the time constant defined by resistor R1. The time constant provided by R1 eliminates capacitors C1 and C7 from charging simultaneously. While capacitor C7 is initially charging, Zener diode D2 prevents drive transistor Q1 from turning on until the diode breakdown voltage is exceeded. This provides a delay which allows the voltage at node 24 produced across capacitor C7 to rise to a level at which the components of the control circuit 22 will be properly biased. The delay insures that the control circuit 22 will be operational before drive transistor Q1 becomes conductive and before current is applied to the primary winding 16 of the output transformer 14.

Capacitor C7 serves as a filter capacitor for the low supply voltage which powers the control circuit 22. During normal operation, the control circuit 22 is supplied with current induced in the secondary winding 20 and conveyed by diode D3 to node 24. In this phase of operation, negligible current flows from the diode bridge rectifier 12 through resistor R1 to node 24. Thus in this mode, the control circuit 22 is supplied by the self-generated low voltage from secondary winding 20, eliminating large power losses which would otherwise occur in resistor R1 to reduce the voltage from rectifier 12 to a relatively low level for powering the control circuit 22.

Eventually, the Zener diode D2 breaks down providing a bias on the base of drive transistor Q1 which renders that transistor conductive and permits current to flow through the primary winding 16. Diode D1 and capacitor C3 block the bias current from flowing through secondary winding 20 at this time. The rapid rise in current through the primary winding 16 induces current in both of the secondary windings 18 and 20. As the current flowing through the primary winding 16 increases, the voltage across current sensing resistor R1 rises proportionally. When this voltage exceeds a threshold level set by the voltage divider, resistors R8–R10, transistor Q4 will turn on. When a cadmium photo cell is used as resistor R9, the threshold level varies with changes in the ambient light so that transistor Q4 turns on at higher primary current levels when the ambient light is brighter. Thus, the gas discharge device will glow brighter in a brightly lighted environment. Capacitor C5 acts as a filter smoothing rise time irregularities which occur in the voltage across the sensing resistor R11, thereby preventing the irregularities from affecting transistor Q4. Transistor Q5 is non-conductive during normal operating conditions.

When transistor Q4 turns on, transistor Q3 becomes conductive turning transistor Q2. The time constant provided by resistor R7 and capacitor C6 insures that transistor Q3 will remain on for several microseconds. In the conductive state, transistor Q2 pulls the base of drive transistor Q1 to circuit ground, turning off the latter transistor. Once the collector of Q2 is at circuit ground potential the network of resistor R4 and capacitor C4 act to affect a very sharp cut turn off and to prevent failure of that transistor. This action terminates the flow of current through the primary winding 16 of output transformer 14, shutting down the application of current in mid-cycle. As the transformer's magnetic field collapses, current is induced in the secondary winding 20, which is applied through resistor R3 to the collector of transistor Q2, causing the voltage at the collector to go negative. This negative bias further expedites the shut down junction sweep of drive transistor Q1.

The current induced in secondary winding 20 as the transformer's field collapses produces a positive voltage at the anode of diode D3, recharging capacitor C7 and providing a positive supply voltage for the control circuit 22. This positive voltage at the anode of diode D3 also is applied by resistor R5 to the base of transistor Q2 further clamping that transistor in a conductive state while shutdown of the current through the primary winding 16 is occurring. Therefore, transistor Q2 continues to be biased conductive for a time after transistors Q3 and Q4 turn off.

When the current through the primary winding 16 drops essentially to zero, transistors Q3 and Q4 turn off. The voltage across secondary winding 20 also goes to zero soon thereafter, turning off transistor Q2 which allows the bias voltage at the base of drive transistor Q1 to rise. Eventually the bias voltage again turns on drive transistor Q1 repeating the cycle in which current pulses are applied through the primary winding 16.

In addition to the magnitude of current through the primary winding 16 controlling the conduction of drive transistor Q1, this transistor also is turned off when the voltage across the primary winding exceeds a given magnitude. As the primary voltage rises, a proportional voltage is induced across the secondary winding 20, which is coupled to the base of transistor Q2 by resistor R5. When this secondary voltage exceeds a predefined level, as determined by the value of resistor R5, transistor Q2 turns on. With transistor Q2 conductive, the base of drive transistor Q1 is pulled to circuit ground cutting off the flow of current through the primary winding 16 until the secondary winding voltage drops below the predefined level.

The operation of the power supply 10 described thus far occurs during normal conditions, in the absence of a ground fault. A high voltage ground fault results due to current leakage from the components connected to the transformer secondary winding 18 high, such as when a conductive path exists between earth ground and a component connected to high voltage terminals 31 and 32 of the power supply 10. In order to prevent a ground fault from causing injury or other damage, the power supply 10 incorporates a ground fault protection circuit 40.

The ground fault protection circuit 40 has first and second toroidal transformers 41 and 42 through which pass the conductors 35 and 36 from the output transformer sub-windings 18a and 18b. After passing through the toroidal transformers, the sub-winding conductors 35 and 36 are connected together and to earth ground at connection 37.

Circuit 40 includes a ground fault interrupter 45, such as a model GL 7101 manufactured by Goldstar Electron Co. Ltd, which has a positive power input terminal coupled to the supply lines of the AC source by a pair of diodes D5 and D6 and resistor R12. A negative power input terminal of the ground fault interrupter 45 is connected to circuit ground and a capacitor C8 is connected across the input terminals.

The first toroidal transformer 41 has a secondary winding 43 with one end connected to circuit ground and another end coupled by resistor R17 to a node between diode D5 and resistor R12. The sensing inputs 47 of the ground fault interrupter 45 are connected to the secondary winding 44 of the second toroidal transformer 42. A capacitor C9 and a sensitivity adjustment potentiometer 46 are connected across the sensing inputs 47 of the ground fault interrupter 45.

The output 48 of the ground fault interrupter 45 is coupled to circuit ground by resistor R13 and capacitor C10 and is connected to the base of transistor Q6. The emitter of transistor Q6 is connected to circuit ground and the collector is coupled by resistor R14 to the input of a monostable multivibrator (one shot) 50. The input of the monostable multivibrator 50 is coupled to circuit ground by capacitor C11 and to the positive voltage at node 24 by resistor R15. The output of the monostable multivibrator 50 is coupled by resistor R16 to the base of transistor Q5. Under normal conditions the monostable multivibrator 50 produces a low output level that maintains transistor Q5 in a non-conductive state. At any given instant during normal operating conditions, equal currents flow through transformer conductors 35 and 36, but in opposite directions. Thus zero net magnetic flux is produced in the toroidal transformers 41 or 42 and no current is induced in windings 43 and 44.

When a ground fault occurs, current from one of the output terminals 31 or 32 of the output transformer 14 typically finds a path through the earth to earth ground connection 37 for the sub-windings 18a and 18b of the output transformer. In that case, the magnitudes of the currents flowing through the two transformer conductors 35 and 36 are not equal which causes a current to be induced in the secondary windings 43 and 44 of the toroidal transformers 41 and 42. However, even if node 37 is not connected to earth ground, as may happen if the power supply 10 is improperly wired to the AC source, a current imbalance in the two transformer conductors 35 and 36 still occurs during high voltage leakage. The current induced in the secondary winding 44 due to the current imbalance is detected by the ground fault interrupter 45 which responds by changing the voltage at its output 48 to a high level. Components R14 and C11 form an RC network having a time constant of 2-4 milliseconds that prevents false triggering of the ground fault protection. If the high output level from the ground fault interrupter 45 lasts for the time period, the monostable multivibrator 50 is triggered to produce a high output pulse that turns on transistor Q5. Turning on transistor Q5 shorts the base of transistor Q3 to circuit ground which in results in drive transistor Q1 turning off. This action stops the power supply from resonating thereby discontinuing the current flow through the primary winding 16 of the output transformer 14 and turning off the gas discharge device 19.

The gas discharge device 19 remains off until monostable multivibrator 50 times out and produces a low output level that turns off transistor Q5 to once again allow the power supply to resonate. If the ground fault still exists at that time, a current imbalance occurs between the transformer conductors 35 and 36 which causes the ground fault interrupter 45 immediately to trigger the monostable multivibrator 50 again. Thus the high voltage is not produced at the secondary 18 of the output transformer and the gas discharge device remains off. This cycling continues for the duration of the ground fault. When the ground fault has been corrected, transistor Q5 again is turned off continuously and the gas discharge device 19 returns to normal operation.

As an alternative, the monostable multivibrator 50 can be replaced by a latch which clamps transistor Q5 in a conductive state when triggered in response to a ground fault. The latch holds the power supply off until the latch is either reset by a manual switch or the AC source is disconnected and reconnected.

The present invention has been described in the context of using a conventional ground fault interrupter circuit 45 which is commercially available from several manufacturers in integrated circuit form. However, the inventive concept may be practiced using a sensing circuit fabricated from individual components instead of using a conventional integrated circuit. Furthermore, while the preferred embodiment senses the current flowing through the conductors 35 and 36 that couple the sub-windings 18a and 18b of the output transformer 14 to earth ground, an alternative embodiment could route the high voltage conductors 33 and 34 through the toroidal transformers 41 and 42 instead of the ground conductors.

We claim:

1. A power supply, for a gas discharge device, comprising:
   first and second output terminals;
   an output transformer having a primary winding, and having a secondary winding with first and second sub-windings inductively coupled to the primary winding;
   a first conductor connecting the first sub-winding to said first output terminal;
   a second conductor connecting the second sub-winding to said second output terminal;
   a third conductor connected between the first sub-winding and a node;
   a fourth conductor connected between the second sub-winding and the node;
   a circuit for sensing an imbalance of current flowing through a pair of conductors selected from a group consisting of the first and second conductors and the third and fourth conductors; and
   a mechanism for applying excitation electricity to the primary winding of said transformer wherein the excitation electricity is disconnected in response to said circuit sensing an imbalance of currents flowing through the pair of conductors.

2. The power supply as recited in claim 1 further including means for connecting the node to earth ground.

3. The power supply as recited in claim 1 wherein said circuit comprises a first current sensing transformer through which the pair of second conductors pass, and having a first secondary coil.

4. The power supply as recited in claim 3 wherein said current sensing transformer is a toroidal transformer.

5. The power supply as recited in claim 3 wherein said circuit further comprises a ground fault interrupter having an input connected to the secondary coil of the current sensing transformer and having an output.

6. The power supply as recited in claim 5 wherein said circuit further comprises a monostable multivibrator with a trigger input coupled to the output of said ground fault interrupter and with an output signal terminal connected to said mechanism.

7. The power supply as recited in claim 6 wherein said circuit further comprises a delay circuit coupling the output of said ground fault interrupter to the trigger input of said monostable multivibrator.

8. The power supply as recited in claim 5 wherein said ground fault interrupter has a pair of power terminals to which electricity is applied to power the ground fault interrupter; and further comprising a second current sensing transformer through which the pair of second conductors pass, and having a second secondary coil coupled to the power terminals of said ground fault interrupter.

9. A power supply, for a gas discharge device, comprising:
first and second output terminals;
an output transformer having a primary winding and a secondary winding with first and second sub-windings inductively coupled to the primary winding, one end of the first sub-winding being connected to said first output terminal and one end of the second sub-winding being connected to said second output terminal;
a first conductor connected between one end of the first sub-winding and earth ground;
a second conductor connected between one end of the second sub-winding and earth ground;
a current sensor for detecting whether current flowing in said first conductor is unequal in magnitude to current flowing in said second conductor; and
a controller connected to the primary winding of the output transformer to form a resonant circuit that applies an excitation current through the primary winding and being responsive to said current sensor detecting an imbalance in the magnitude of current flowing through said first and second conductors by ceasing to apply the excitation current.

10. The power supply recited in claim 9 wherein said current sensor has a current sensing transformer through which the first and second conductors pass, and a secondary coil.

11. The power supply as recited in claim 10 wherein said current sensor further comprises a ground fault interrupter having an input connected to the secondary coil of the current sensing transformer.

12. The power supply as recited in claim 10 wherein said current sensor comprises
a ground fault interrupter having an input connected to the secondary coil of the current sensing transformer and having an output;
a delay circuit connected the output of said ground fault interrupter; and
a monostable multivibrator having a trigger input coupled by said delay circuit to the output of said ground fault interrupter, and producing an output signal applied to said controller.

13. The power supply as recited in claim 10 wherein said current sensor comprises
a ground fault interrupter having an input connected to the secondary coil of the current sensing transformer and having an output;
a delay circuit connected the output of said ground fault interrupter: and
a latch having a trigger input coupled by said delay circuit to the output of said ground fault interrupter, and producing an output signal applied to said controller.

* * * * *